United States Patent
Takahashi et al.

(10) Patent No.: US 8,720,919 B2
(45) Date of Patent: May 13, 2014

(54) SUSPENSION SUBFRAME

(75) Inventors: Hiroshi Takahashi, Ageo (JP); Youhei Koiso, Yokohama (JP)

(73) Assignee: Yorozu Corporation, Kanagawa (JP)

( * ) Notice: Subject to any disclaimer, the term of this patent is extended or adjusted under 35 U.S.C. 154(b) by 0 days.

(21) Appl. No.: 13/519,845

(22) PCT Filed: Dec. 15, 2010

(86) PCT No.: PCT/JP2010/072586
§ 371 (c)(1),
(2), (4) Date: Aug. 27, 2012

(87) PCT Pub. No.: WO2011/081021
PCT Pub. Date: Jul. 7, 2011

(65) Prior Publication Data
US 2012/0319389 A1 Dec. 20, 2012

(30) Foreign Application Priority Data

Dec. 28, 2009 (JP) .................................. 2009-298411
Aug. 25, 2010 (JP) .................................. 2010-188776

(51) Int. Cl.
*B62D 21/11* (2006.01)
(52) U.S. Cl.
USPC .................................................. 280/124.109
(58) Field of Classification Search
USPC .................................................. 280/124.109
See application file for complete search history.

(56) References Cited

U.S. PATENT DOCUMENTS

| | | | | |
|---|---|---|---|---|
| 4,501,436 A * | 2/1985 | Ishida | ..................... | 280/124.108 |
| 5,251,932 A | 10/1993 | Ide | | |
| 6,109,654 A * | 8/2000 | Yamamoto et al. | ........... | 280/784 |
| 6,409,216 B2 * | 6/2002 | Suzuki | ........... | 280/781 |
| 6,494,472 B2 * | 12/2002 | Suzuki | ........... | 280/124.109 |
| 6,783,157 B2 * | 8/2004 | Huang et al. | ........... | 280/785 |
| 6,880,663 B2 * | 4/2005 | Fujiki et al. | ........... | 180/232 |
| 7,258,354 B2 * | 8/2007 | Kim et al. | ........... | 280/124.109 |
| 7,461,850 B2 * | 12/2008 | Kurth | ........... | 280/124.109 |
| 7,520,514 B2 * | 4/2009 | Ogawa et al. | ........... | 280/124.109 |
| 7,976,037 B2 * | 7/2011 | Yoshida et al. | ........ | 280/124.109 |
| 8,246,061 B2 * | 8/2012 | Kang | ........... | 280/124.109 |

FOREIGN PATENT DOCUMENTS

| | | | |
|---|---|---|---|
| JP | 61128177 A | 6/1986 | |
| JP | 03091282 A | 4/1991 | |
| JP | 08156829 A | 6/1996 | |
| JP | 10230869 A | 9/1998 | |
| JP | 2963749 | 10/1999 | |
| JP | 2000344130 A | 12/2000 | |
| JP | 2004210013 A | 7/2004 | |
| JP | 2005138652 A | 6/2005 | |
| JP | 2008120390 A | 5/2008 | |

* cited by examiner

*Primary Examiner* — Nicole Verley
(74) *Attorney, Agent, or Firm* — Novak Druce Connolly Bove + Quigg LLP

(57) ABSTRACT

Disclosed is a suspension subframe (1) in which highly rigid side-end members (10) are attached to opposite side end sections of a flat plate-like main body member (2) so as to extend in the front-rear direction of a vehicle. The subframe (1) has extremely high rigidity against forces acting thereon from the front, rear, left, right and the like with the aid of the side-end members (10). The subframe (1) makes it possible to cut out materials with almost zero waste, and is made lightweight and inexpensive.

6 Claims, 8 Drawing Sheets

FIG.4 ( A )
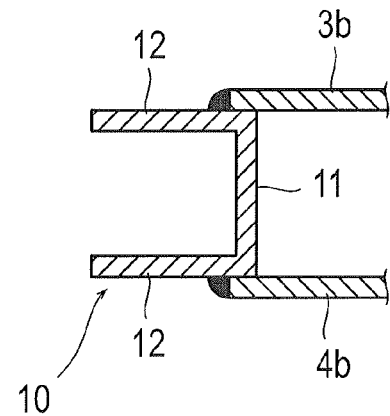
FIG.4 ( B )
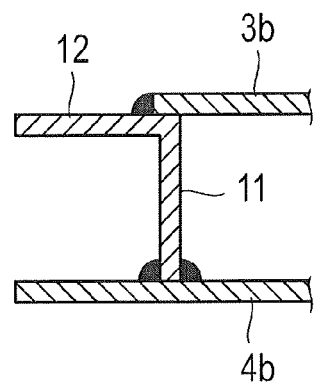
FIG.4 ( C )
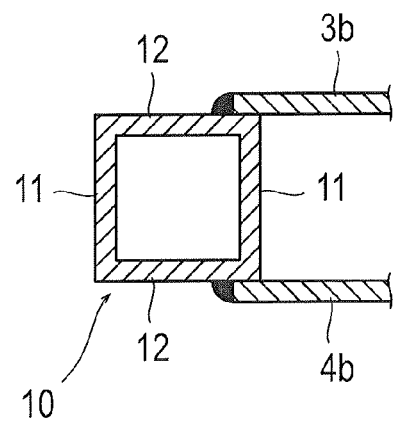

SUSPENSION SUBFRAME

PRIORITY

Priority is claimed as a national stage application, under 35 U.S.C. §371, to PCT/JP2010/072586, filed Dec. 15, 2010, which claims priority to Japanese Application No. 2009298411, filed Dec. 28, 2009, and Japanese Application No. 2010188776, filed Aug. 25, 2010. The disclosures of the aforementioned priority applications are incorporated herein by reference in their entirety.

TECHNICAL FIELD

The present invention relates to a subframe used for a suspension of an automobile.

BACKGROUND ART

Generally, a suspension of a vehicle has a subframe located between left and right wheels. While being coupled with the vehicle body, this subframe is coupled with the wheels through lower arms and knuckles. Therefore, the subframe is required to have sufficient rigidity against forces transmitted thereto from the wheels and acting thereon in the front-rear, left-right, and top-bottom directions. Further, it is preferable that the subframe be configured to efficiently transmit and reliably support these inputs.

As a conventional subframe, a subframe obtained by press-molding a relatively large plate material is used. For the purpose of imparting high rigidity to this subframe, for example, Japanese Patent No. 2963749 discloses one having irregularities partially formed on the plate material, whereas Japanese Unexamined Patent Application Publication No. 2005-138652 discloses one having a reinforcement body provided between an upper panel and a lower panel.

However, the use of a plate material having such a large area is likely to cause wastes from a parent material when a material for a subframe is cut out from the parent material in the manufacture thereof, and there is a risk of manufacturing the subframe at a cost disadvantage. There are cases configured for the purpose of imparting high rigidity to a subframe, such as one where a subframe has irregularities partially formed thereon, and one where a subframe has a reinforcement body inside an upper panel and a lower panel. However, neither of these cases is preferable because the weight of the whole subframe increases as a result. Particularly, in the case intended to secure rigidity by forming irregularities on a plate material, it is required that the number of times for press work on the plate material is increased, which complicates the manufacture of the subframe and manufactures the subframe at a cost disadvantage.

SUMMARY OF INVENTION

The present invention was made in order to solve problems accompanying the above conventional technologies, and the object thereof is to provide a highly safe suspension subframe having extremely high rigidity against forces that act thereon in any directions, being lightweight and inexpensive, and having general versatility.

A suspension subframe according to the present invention for the achievement of the above object includes: a main body member arranged between wheels; and side-end members molded so as to have high rigidity independently from the main body member. The suspension subframe is characterized in that the side-end members are attached to opposite side end sections of the main body member in the width direction of a vehicle so as to extend in the front-rear direction of the vehicle.

According to the present invention thus configured, the main body member is reinforced by the highly rigid side-end members, and high rigidity is imparted to the entire subframe. Further, the main body member having a large area is downsized in a manner corresponding to the provision of the opposite side-end members. This makes it possible to cut out materials with almost zero waste. Besides, the respective opposite side-end members may be formed of plate materials having small areas. Consequently, waste produced in cutting out materials for the entire subframe is almost eliminated, which makes the subframe advantageous in terms of cost.

Particularly, the provision of the main body member between the highly rigid side-end members makes it possible to readily correspond to specification differences, among vehicles using subframes, such as whether the vehicles are two-wheel or four-wheel drive, different types of engine mounted thereon, different types of tread, and requirements different by model and by destination region. This is because, despite such various specification differences, sharing of components is made possible simply with a minimum change made in each section of subframes or with the plate thickness and shape of each section thereof controlled. That is, the basic requirement for the sharing is simply to use identical components for the side-end members at the opposite side ends and use different components for sections corresponding to the main body members. Therefore, suspensions that can readily absorb specification differences among vehicles are obtained, which contributes to cost reduction for suspensions as a result.

In addition, with the side-end members provided at the opposite side-end sections of the main body member so as to extend in the front-rear direction of the vehicle, the side-end members are enabled to, at the occurrence of a head-on collision, counteract inputs from the collision. The safety of the vehicle interior is thereby improved.

According to a second aspect of the invention, each of the side-end members is composed of a frame-like member having a space in which the base end section of an arm member is housed. Therefore, the arm member can be attached to the section having high rigidity, which makes the suspension extremely highly rigid enough to counteract forces that act on the arm members from the wheels in the front-rear, left-right or top-bottom direction. Besides, the arm members can be attached by use of the spaces in the side-end members, which not only provides improved workability but also allows greater flexibility in designing the arm members.

According to a third aspect of the invention, in a case where a frame-like member having a cross section perpendicular to the axis that is formed in an angular U-shape or an L-shape is used as each of the side-end members, a space is formed for installing a lower arm in the outer side of the frame-like member. This not only allows easy installation of the lower arm therein and facilitates assembly of the suspension, but also allows greater flexibility in designing the arm members. Alternatively, in a case where a frame-like member having a shape of a hollow square is used, only the base end section of the lower arm is required to be housed in the frame-like member, and the cross section thereof perpendicular to the axis has a closed structure, which makes the side-end member more highly rigid.

According to a fourth aspect of the invention, coupling members configured to couple the subframes with the vehicle body are directly attached to the side-end members. Therefore, forces transmitted from the wheels through the arm members and acting in any directions can be transmitted directly to the coupling members, the main body member, and the vehicle body through the side-end members. Thus, efficiency in transmitting inputs is extremely improved, and a handling to the inputs becomes easier. Additionally, these inputs are transmitted to the main body member after being counteracted primarily by the highly rigid side-end members, whereby the main body member can be made more lightweight through reduction of the plate thickness and downsizing of the cross-section area.

According to a fifth aspect of the invention, the front or rear end section of the main body member is bent to form a vertical wall. This vertical wall serves to make the main body member highly rigid, and in addition, the main body member is brought in a state surrounded by the highly rigid side-end members and the vertical wall. This makes the suspension more highly rigid.

According to a sixth aspect of the invention, the vertical wall is positioned on the line connecting the support points for supporting the base end sections of the arm members or positioned in the vicinity thereof. Therefore, the vertical wall counteracts inputs from the arm members, which makes the main body member more highly rigid.

According to a seventh aspect of the invention, the main body member is composed of a molded plate having a rectangular shape in a plan view. Therefore, material cutout produces almost zero waste even in a case of the main body member having a large area, whereby the subframe is made advantageous in terms of cost.

According to an eighth aspect of the invention, the main body member is composed of a molded plate that has a framed structure shaped like a curb. Therefore, the main body member can be made lightweight even in a case where the main body member has a large area.

Other objects, characteristics and features of the present invention will become apparent upon consideration of a preferred embodiment shown exemplarily in the following description and the accompanying drawings.

BRIEF DESCRIPTION OF THE DRAWINGS

FIG. 4(A) is a schematic cross-sectional view taken along the 4-4 line of FIG. 2, and FIGS. 4(B) and 4(C) are schematic cross-sectional views showing other examples.

DESCRIPTION OF EMBODIMENTS

An embodiment of the present invention is described below in detail.

Figure 1:
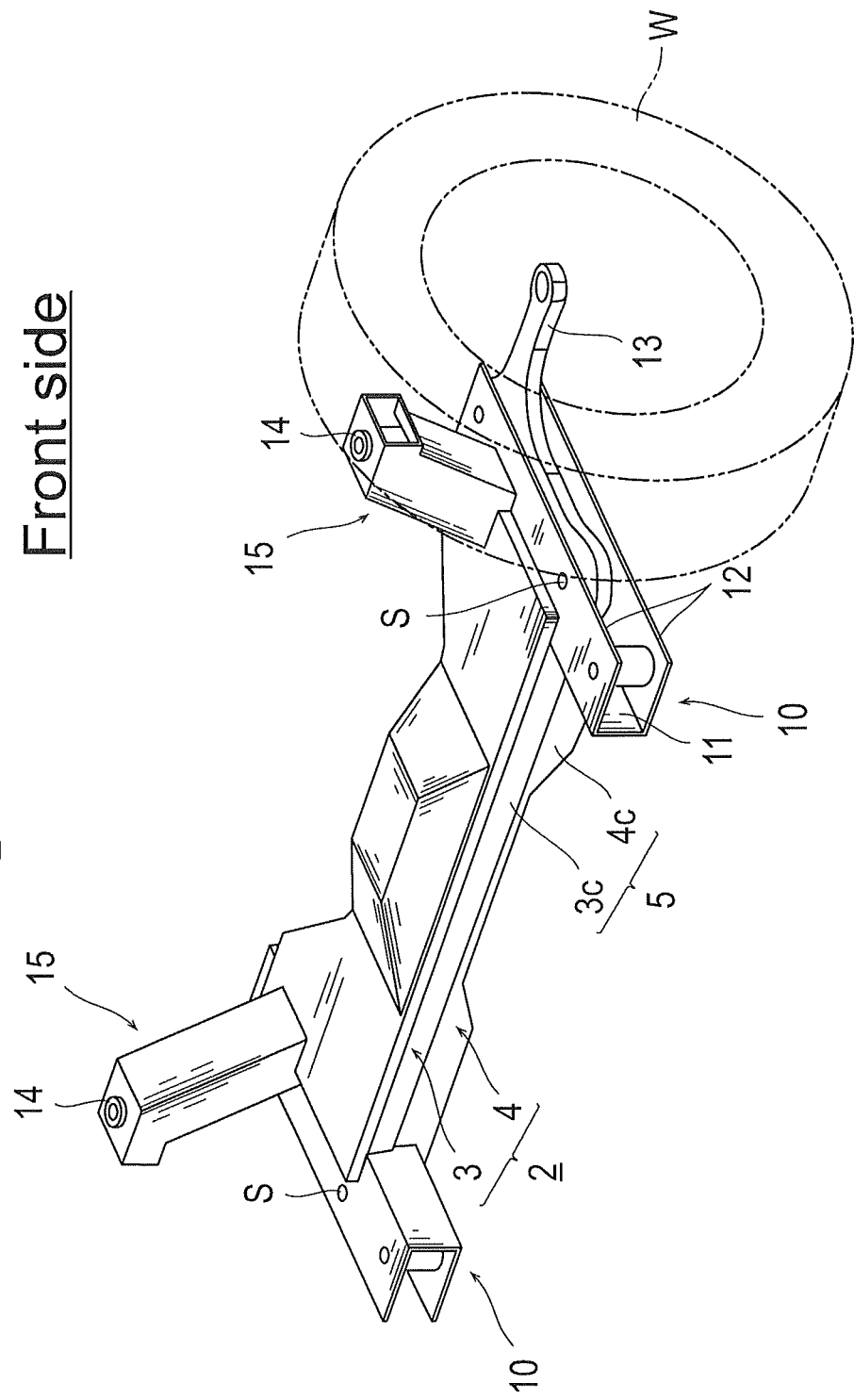
FIG. 1 is a schematic perspective view showing a suspension according to an embodiment of the present invention.

In FIG. 1, a suspension subframe 1 according to this embodiment is intended for a front suspension. In general, the subframe 1 includes a main body member 2 which is arranged between wheels W (only one of the wheels is shown in the drawing) and has a relatively large area and side-end members 10 attached to both end sections of this main body member 2 in the width direction of a vehicle. The main body member 2 and the side-end members 10 are attached to a vehicle body through coupling members 15. However, the main body member 2 and the side-end members 10 may be attached to a vehicle body directly or through height adjusting members, without the use of the coupling members 15 which have a predetermined height in the top-bottom direction.

Figure 2:
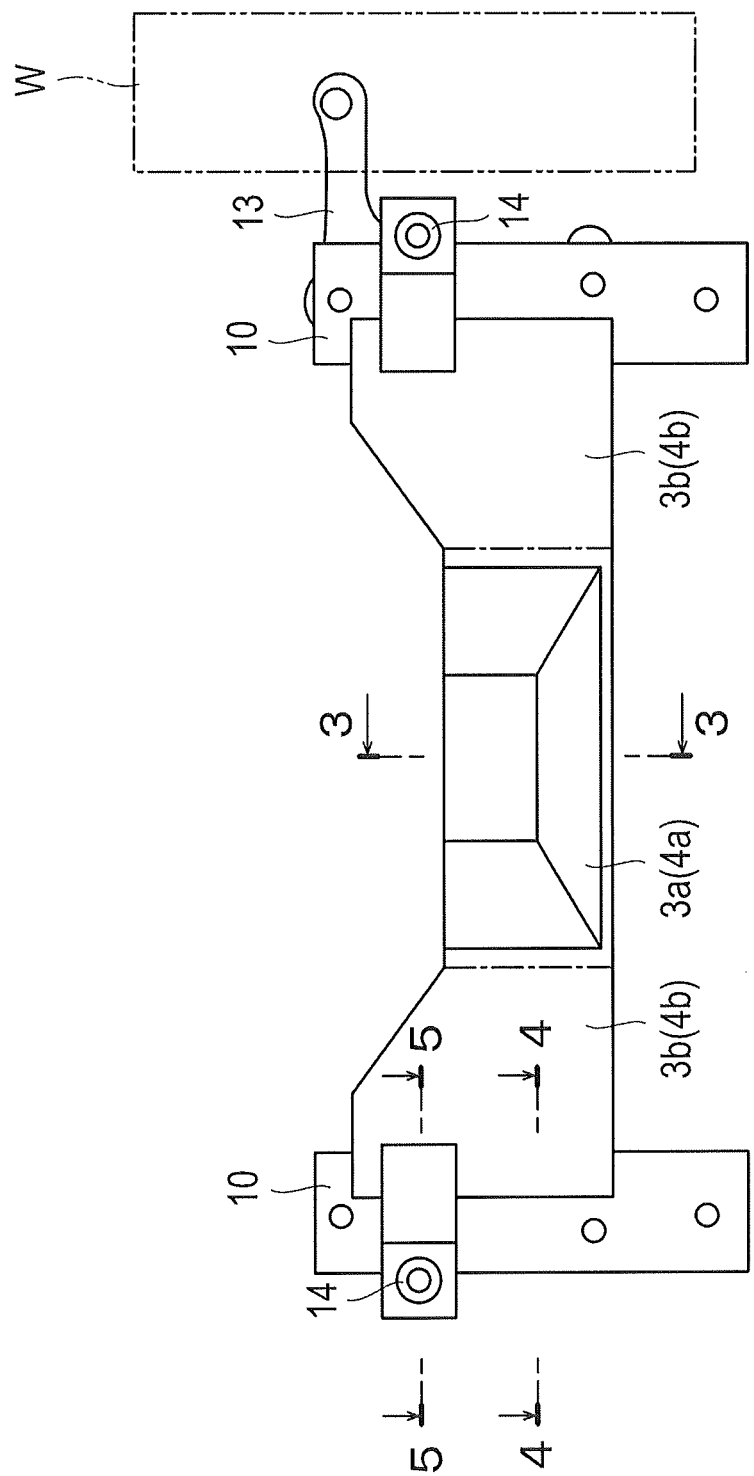
FIG. 2 is a schematic plan view of FIG. 1.

Further details are described herein. Firstly, as shown in FIGS. 1 and 2, the main body member 2 as a whole is substantially I-shaped in a plan view and includes an upper member 3 and a lower member 4.

The upper member 3 has a swell section formed in the center thereof, which is upwardly. The lower member 4 has some irregular portions formed therein for the convenience of surrounding devices. These upper member 3 and lower member 4, which basically have external forms that are almost the same, are obtained by press-molding plate materials. That is, as shown in FIG. 2, the upper member 3 and the lower member 4 include: substantially rectangular main plate sections 3a and 4a (regions encircled with alternate long and short dashed lines); and substantially trapezoidal side plate sections 3b and 4b which are provided away from this main plate section 3a in both width directions of the vehicle. These side plate sections 3b and 4b are formed in a manner widening toward the outward ends thereof along the width direction of the vehicle. In this manner, a joint region between the main body member 2 and each of the highly rigid side-end members 10 described below is enlarged, and the rigidity of the main body member 2 is increased, which is preferable.

The end sections 3b and 4b of the upper member 3 and the lower member 4, at the two opposite sides along the width direction of the vehicle, are coupled together by fixation means such as welding or bolt while being mounted on the upper and lower surfaces of the side end members 10 (refer to FIG. 4). However, instead of employing this manner of joining, the coupling may be achieved by bending the end sections 3b and 4b at the opposite sides and then coupling the bent ends thereof with upstanding sections 11 of the side-end members 10 by fixation means such as welding or bolt.

Figure 3:
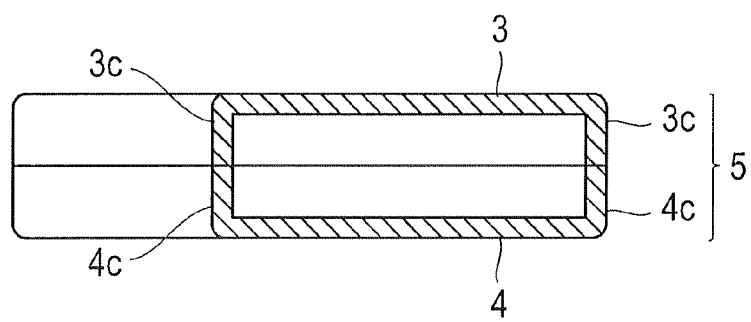
FIG. 3 is a schematic cross-sectional view taken along the 3-3 line of FIG. 2.
Figure 3:
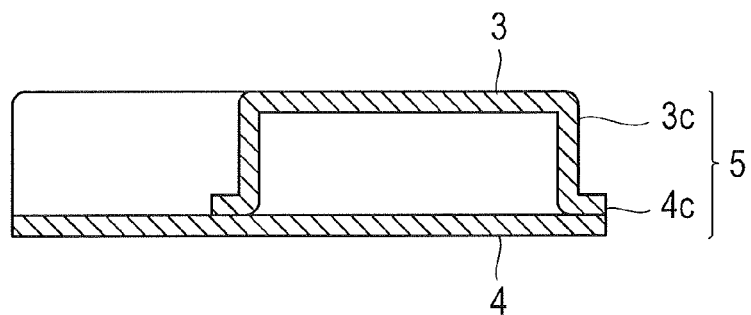
Figure 3:
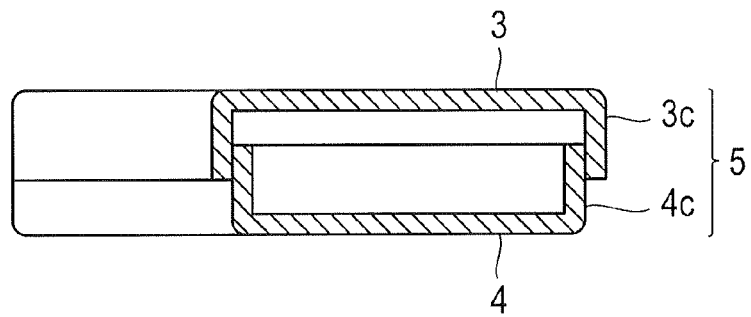

On the other hand, as shown in FIG. 3(A), the end sections 3c and 4c of the upper member 3 and the lower member 4 in the front-rear direction are bent at the right angle, and the leading ends of the end sections 3c and 4c are caused to abut each other, so that vertical walls 5 are formed. The formation of the vertical walls 5 not only makes the main body member 2 more highly rigid, but also brings the main body member 2 into a state surrounded by the highly rigid side-end members 10 and the vertical walls 5. This makes the suspension more highly rigid.

Note that the formation of these vertical walls 5 does not necessarily require bending at the right angle and causing the leading ends to abut each other. The vertical walls 5 may be formed by causing obliquely-sloped sections to abut each other (not illustrated), or may be formed as L-shaped ones as shown in FIG. 3(B), or formed with the leading ends overlapped on each other as shown in FIG. 3(C).

Particularly, it is preferable that the vertical walls 5 be formed with the end sections 3c and 4c positioned on the line connecting the right and left support points S (refer to FIG. 1) for supporting the base end sections of arm members 13, or positioned in the vicinity of this line. Thus, the vertical walls 5 are caused to counteract inputs from the arm members 13, whereby the main body member 2 is made more highly rigid.

In addition, the main body member 2 as a whole has a hollow structure, which contributes to making the whole subframe 1 lightweight. Note that, although the vertical walls 5 may be formed simply by having the ends 3c and 4c bent, it is preferable that the end faces thereof be caused to agree each other or be joined by welding, which further increases the rigidity thereof.

Next, the side-end members 10, which have high rigidity, are formed independently from the main body member 2 as shown in FIGS. 1 and 2. The following various advantages are brought in a case where the highly rigid side-end members 10 are molded independently from the main body member 2.

(1) Easy formation of the side-end members 10 having desired rigidity is enabled.

(2) In the subframe, each of the side-end members 10 comes to function as a so-called "pivot" or "core", thereby substantially improving the rigidity of the whole subframe as well.

(3) The provision of the main body member 2 between the highly rigid side-end members 10 makes it possible to form the subframe 1 with these side-end members 10 used as supports for the formation. Consequently, it is made possible to readily correspond to specification differences, among vehicles using subframes, such as whether the vehicles are two-wheel or four-wheel drive, different types of engine mounted thereon, different types of tread, and different requirements by model and by destination region. This is because, despite such various specification differences, sharing of components is made possible simply with a minimum change made in each section of subframes or with the plate thickness and shape of each section thereof controlled. That is, the basic requirement for the sharing is simply to use identical components for the side-end members at the both side ends and use different components for sections corresponding to the main body members. Therefore, suspensions that can readily absorb specification differences among vehicles are obtained, which contributes to cost reduction for suspensions as a result.

(4) In a case where the side-end members 10 is provided so as to extend in the front-rear direction of the vehicle, a cross-sectional shape of the side-end members is uniform in the front-rear direction of the vehicle. In this case, the safety of a passenger is improved in addition since the highly rigid side-end members 10 prevent the front part of the vehicle from being severely deformed at the occurrence of a head-on collision or an offset collision.

Any member may be used as each of the side-end members 10 as long as these members have a cross-sectional shape with high rigidity. For example, any one of those shown in FIGS. 4(A) to 4(C) may be used. That is, it is preferable that a frame-like member having a cross section perpendicular to the axis that is formed in an angular U-shape, an L-shape, or a shape of a hollow square be used.

As shown in FIG. 4(A), the side-end member 10 can be made extremely highly rigid in a case where a member having a cross section perpendicular to the axis that is formed in an angular U-shape, i.e., a member having horizontal sections 12 provided to the upper end and the lower end of the upstanding section 11. In a case where the member having a cross section perpendicular to the axis that is formed in an angular U-shape is arranged so as to open outward, i.e., so that the open side thereof may be located outside in the width direction of the vehicle, a lower arm 13 can be installed therein by the utilization of a space created by the angular U-shape thereof. This not only provides improved workability but also allows greater flexibility in designing the arm member.

As shown in FIG. 4(B), the side-end member 10 is made extremely highly rigid also in a case where a member having a cross section perpendicular to the axis that is formed in an L-shape, i.e., a member having a horizontal section 12 provided to either of the upper end or the lower end of the upstanding section 11. Also in this case, it is possible to secure a space for installing the lower arm 13. However, it is preferable that the side-end section 4b in the lower part of the main body member 2 be projected outward.

As shown in FIG. 4(C), in a case where a member having a cross section perpendicular to the axis that is shaped like a hollow square, i.e., a member having a cross section perpendicular to the axis that has a closed structure, it is required simply to house only the base end section of the lower arm 13 in the inside of the frame-like member, which makes the side-end member more highly rigid.

Note that, with respect to the lower arm 13, which is configured to couple the subframe 1 to a corresponding one of the wheels W and is attached to the side-end member 10 so as to be able to swing upward and downward, the components surrounding this lower arm 13, and a section coupling the lower arm 13 with the wheel W are publicly known, and description thereof is therefore omitted.

Materials for the main body member 2 and each of the side-end members 10 are press-molded after by being punched out from belt-like plate materials. Since the main body member 2 having a large area in the subframe 1 has a shape that is composed of rectangular sections and trapezoidal sections and thereby the material punching for the main body member 2 produces little waste. Therefore, the main body member 2 has a cost advantage. On the other hand, the material punching for these side-end members 10 also produces little waste since the punching only requires that the materials be punched out into substantially rectangular shapes before being molded by bending.

Incidentally, although the main body member 2 and the side-end members 10 may be molded at one time by punching out the same material, it is preferable, for the purpose of imparting further higher rigidity to the side-end member 10, that molding be applied separately to the main body member 2 and to the side-end members 10.

However, a manner to mold the main body member 2 and the side-end members 10 is not necessarily limited either to punching or bending. In some cases, the main body member 2 and the side-end members 10 may be molded by use of pipe-shaped materials, materials having structures of a closed cross section, or the like.

Figure 5:
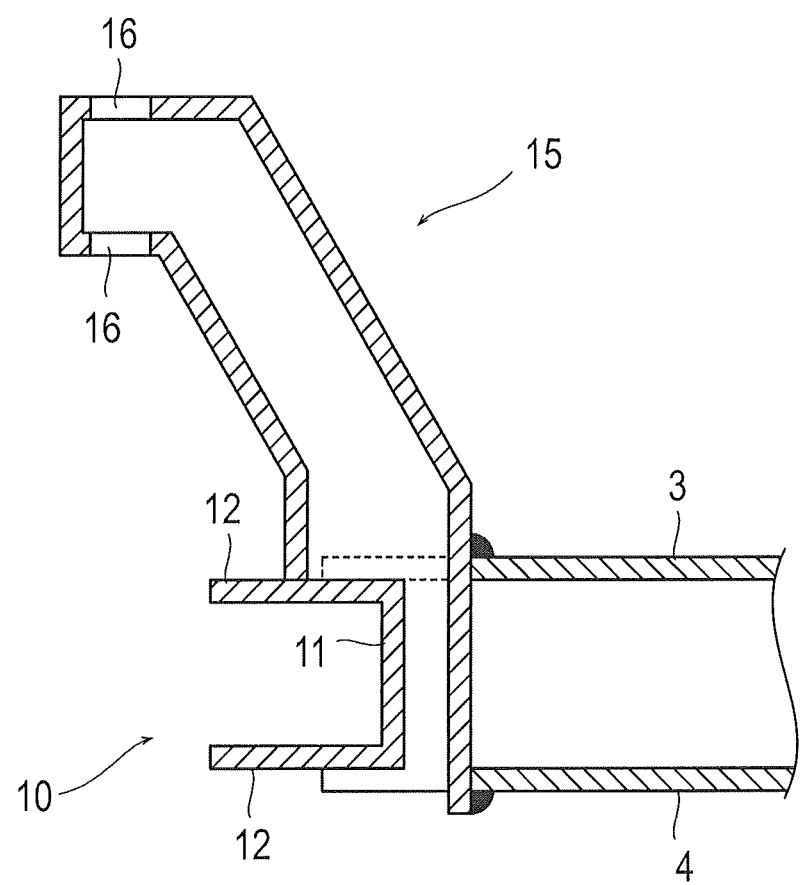
FIG. 5 is a schematic cross-sectional view taken along the 5-5 line of FIG. 2.

As shown in FIGS. 1 and 5, coupling members 15, which couple the subframe 1 with the vehicle body, are provided in a manner extending from the top surfaces to the internal surfaces of the corresponding side-end member 10. As shown in FIG. 5, each of the coupling members 15 has a through-hole 16 formed in the top thereof. A bolt, a bush 14 and the like, which are used for coupling with the vehicle body, are inserted into the through hole 16. In the lower part of the coupling member 15, the outer section is welded to the side-end member 10 while being mounted thereon. While being inserted into the upper member 3 of the main body member 2 and reaching the lower member 4, the inner section is welded to these upper member 3 and lower member 4.

Thus, the coupling members 15 are attached directly to the highly rigid side-end members 10. Therefore, not only the coupling members 15 are provided with high rigidity, but also direct transmission of forces to the coupling members 15, the main body member 2, and the vehicle body through the side-end members 10 is allowed without any attenuation of the forces, the forces having been transmitted from the wheels through the lower arms 13 and acting in any directions. As a result, efficiency in transmitting inputs is remarkably improved, whereby handling of the forces is simplified. Besides, these forces are transmitted to the coupling members 15, the main body member 2, and the vehicle body after being counteracted by the highly rigid side-end members 10, whereby weight reduction of the main body member 2 can be pursued by thinning the plate thickness and reducing the size of the cross section.

In this embodiment, the coupling members 15 are installed on the side-end members 10 and extended along the upstanding sections 11 of the side-end members 10, which imparts high rigidity to the coupling members 15. In some cases, however, each of the coupling members 15 may be welded to the side-end members 10 and the main body member 2 while being mounted straddling the side-end member 10 and the main body member 2. Alternatively; the coupling member 15 may be welded under the condition that the lower part of the coupling member 15, after being inserted through the upper member 3 of the main body member 2, is extended to the extent that the lower part reaches the lower surface of the horizontal section 12 of the side-end member 10.

Each of the coupling members 15, which are configured to directly couple the suspension with the vehicle body, is composed of a hollow member for the purpose of weight reduction, the hollow member being formed by combining and welding together press-molded components. However, formation of the hollow member is not limited to the above manner, and may be achieved by use of a pipe.

Next, manufacturing and operation of this embodiment are described.

In manufacturing the subframe of this embodiment, at the beginning, plate materials for the upper member 3 and the lower member 4 of the main body member 2 are punched out from a belt-like long plate material by use of a pressing machine, whereby the materials are cut out. In this case, the main body member 2 has a shape that enables a punching from the materials at relatively little clearance, which makes waste less likely to be produced and places the main body member 2 at an extreme cost advantage. Note that, obviously, the molding may be carried out without the use of a pressing machine but by the application of sheet hydroforming or the like so as to form the upper member 3 and the lower member 4 as one body having a hollow cross-sectional shape.

Next, the plate materials for the upper member 3 and the lower member 4 are press-molded. These two members are joined together, and the joint surfaces thereof are welded together, whereby the main body member 2 is formed. However, in a case where use of only any one of the upper member 3 and the lower member 4 is enough to secure sufficient rigidity because of a type of the vehicle, only the one may be used.

For the side-end members 10, a plate material different from one used for the main body member 2 is used, and materials of a substantially rectangular shape are punched out from this plate material. Also in this case, as in the case of the main body member 2, the material cutout produces little waste because a plate material for each of the side-end members 10 has a substantially rectangular shape. This plate material is press-molded into a long frame-like member having a cross section perpendicular to the axis that is formed in an angular U-shape, a L-shape or a shape like a hollow square. Note that, also in this case, obviously, the molding may be carried out without the use of a pressing machine but by the application of sheet hydroforming or the like.

Thereafter, each of the side-end members 10 is brought into surface contact with a corresponding one of the side end sections of the main body member 2. Then, the side-end members 10 are coupled firmly with the main body member 2 by fixation means such as welding or bolt.

Finally, welding is carried out with each of the coupling members 15 placed on a corresponding one of the side-end members 10, or in some cases, with the coupling member 15 placed straddling joint sections of the main body member 2 and the side-end member 10.

As a result, the subframe 1 of this embodiment has all of the members attached to the highly rigid side-end members 10, whereby high rigidity is imparted to the entire subframe 1.

The thus molded subframe 1 is placed in an engine room. Then, the setup of the subframe 1 is completed by having the coupling members 15 coupled with the vehicle body and having the lower arms 13 attached to the side-end members 10. Note that the lower arms 13 may be attached directly to the side-end members 10 or may be attached thereto through brackets provided as separate bodies.

Then, from the wheels W, various forces or moments act upon the subframe 1 through the lower arms 13 in any directions such as the front-rear, right-left and top-bottom directions. The subframe 1 is acted upon by, for example, forces in the top-bottom direction that correspond to upward and downward movements of the wheels W during running of the vehicle, forces in the front-rear direction that are generated in braking the vehicle, or moments corresponding to torsion of the vehicle body that occurs in steering the vehicle. Such forces temporarily act on the side-end members 10, and are transmitted to the vehicle body and the main body member 2 directly through coupling member 15. For this reason, these inputs neither attenuate during the course of the transmission nor act on other members, and therefore are extremely efficiently transmitted. This allows reduction of the plate thickness and the cross-section area of the main body member 2 and thereby contributes to weight reduction of the main body member 2.

<Variation 1>

Figure 6:
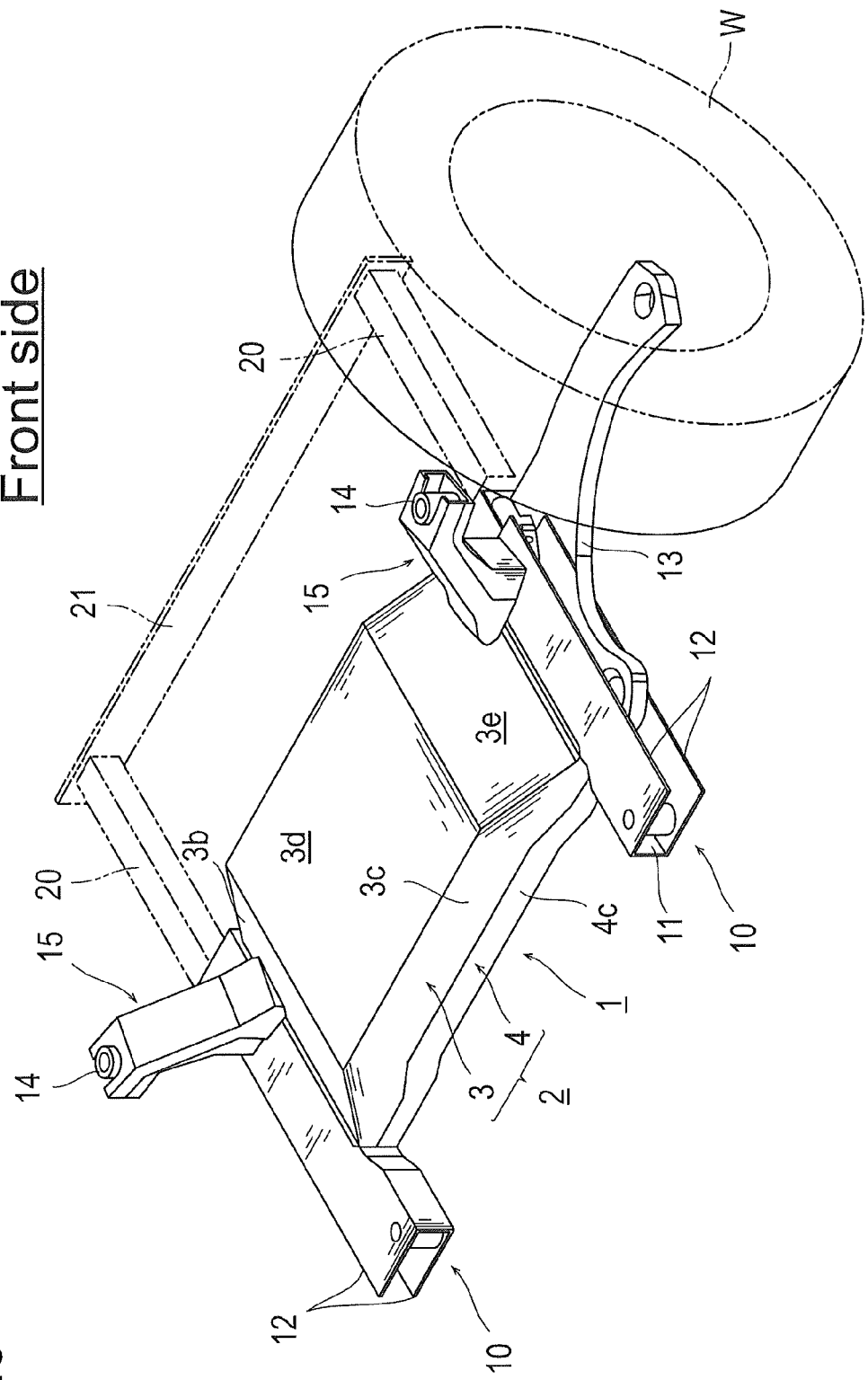
FIG. 6 is a schematic perspective view showing Variation 1 of the embodiment.
Figure 7:
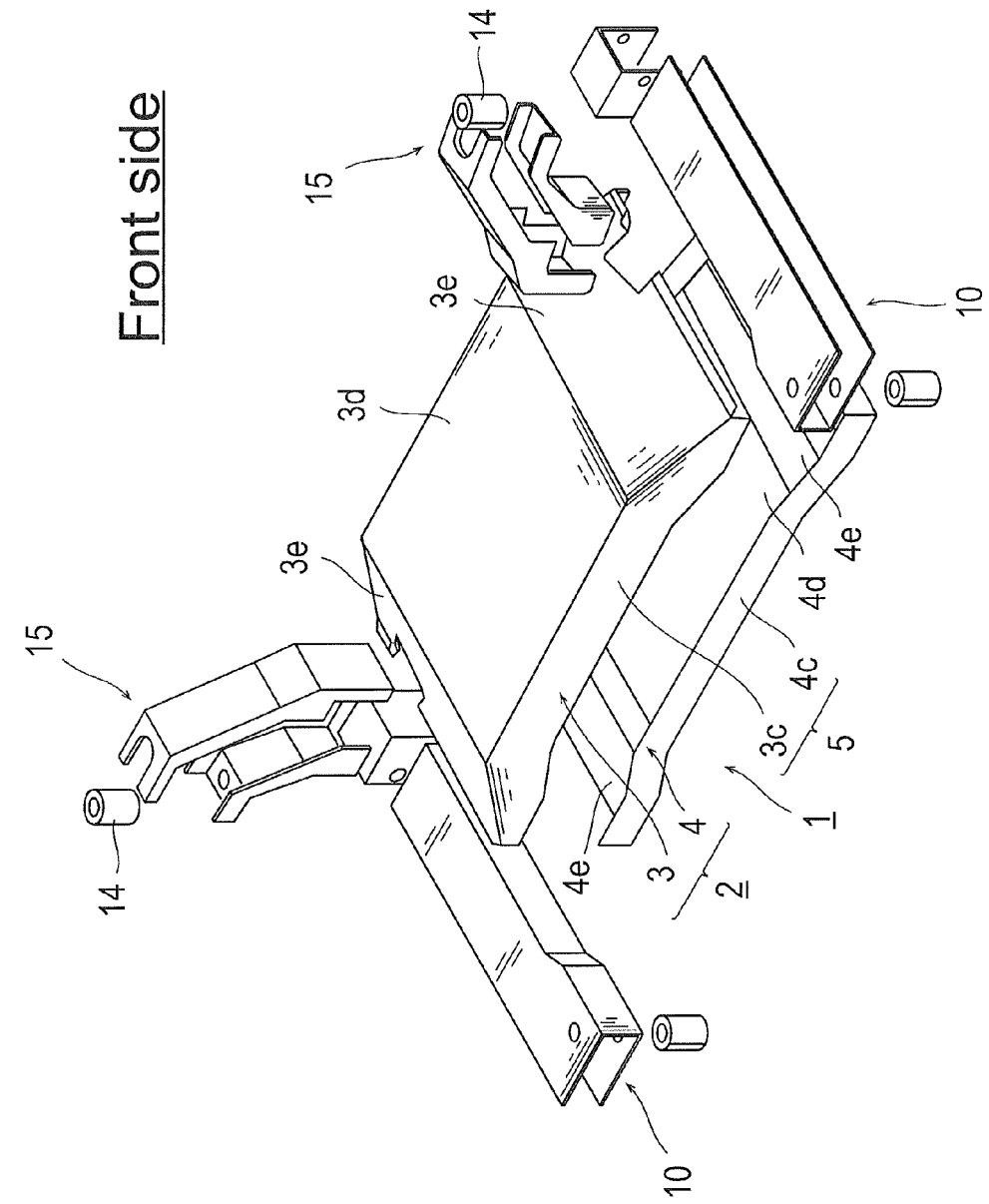
FIG. 7 is an exploded perspective view of FIG. 6.

FIG. 6 is a schematic perspective view showing Variation 1 of the embodiment. FIG. 7 is an exploded perspective view of FIG. 6. Note that the same reference signs are used for members that are the same as shown in FIGS. 1 to 5, and description thereof is omitted.

The main body member 2 described above is substantially "I"-shaped in a plan view. However, the main body member 2 may be composed of the upper member 3 and the lower member 4, which have substantially rectangular shapes in a plan view, as shown in FIG. 6.

The upper member 3 is obtained by molding, into one body, a main plate section 3d centrally located, sloping plate sections 3e located at both side ends, and endplates 3c located at the front and the rear. In a frontal view from the front side, the upper member 3 has a convex shape. Note that the top surface of the main plate section 3d is flatly formed, so that a steering gear box and the like are mounted thereon.

As shown in FIG. 7, the lower member 4 includes a main plate section 4d, which is centrally located and flat, sloping sections 4e set sloping downward from the fringe of the main plate section 4d, and end plates 4c provided upright at the fringes of the sloping sections 4e. This lower member 4 is also formed into a convex shape. After the upper member 3 and the lower member 4 are fitted together into one hollow body, the end plates 3c located at the front and the rear of the upper member 3 and the end plates 4b of lower member 4 are welded together along the entire perimeter.

In case where the main body member 2 is thus formed into a substantially rectangular shape in a plan view, waste produced in the material cutout is further reduced as compared to the foregoing embodiment.

Also in Variation 1 here, the highly rigid vertical walls 5 are formed in the front-rear direction, which impart extremely high rigidity to the subframe in combination with the highly rigid side-end members 10. Further, the use of a structure obtained by fitting the upper member 3 and the lower member 4 into one hollow body makes it possible to further increase the rigidity of the vertical walls 5, and contributes to weight reduction of the subframe 1 by making the subframe 1 hollow.

As in the case of the above described embodiment, as long as high rigidity is secured, it is not necessarily required to use both of the upper member 3 and the lower member 4, and only either one thereof may be used. Further, even in a case of using the both, it is not required to weld the perimeters of the upper member 3 and lower member 4. Moreover, it is obvious that the upper member 3 and lower member 4 are not required to be convex.

While the side-end members 10 are identical to those in the above described embodiment, so-called crash bars 20 may be attached to the front ends of the respective side-end members 10 as shown in FIG. 6. The attachment may be direct, or in some cases, may be carried out by means of brackets. The crash bars 20 are configured to have the function of absorbing external forces at the occurrence of a head-on collision and therefore are formed as hollow bars, but may be solid. In this manner, additional safety is imparted to the vehicle, which is effective particularly in cases of a small vehicle. The crash bars 20 may be provided in such a manner that, as shown in FIG. 6, the front ends of the two crash bars 20 are coupled with each other by a connector plate 21. In this manner, additional strength is imparted to the crash bars 20, which is preferable.

The attachment of the crash bars 20 to the front ends of the side-end members 10 not only makes the crash bars 20 supported by extremely rigid objects, but also allows, for example, at the occurrence of a head-on collision, the long axes of the side-end members 10 to be put in the same direction as taken by a force that acts thereon. As a result, even in a case where the crash bars 20 are deformed by a considerably large impact force, the side-end members 10 counteract this force, thereby preventing the force from negatively impacting the vehicle interior. In addition, controlling the absorbed amount of collision energy may be possible by deformation of the crash bars 20 in some cases.

Note that, obviously, the crash bars 20 as described here are applicable to the above described embodiment and Variation 2 described later.

<Variation 2>

Figure 8:
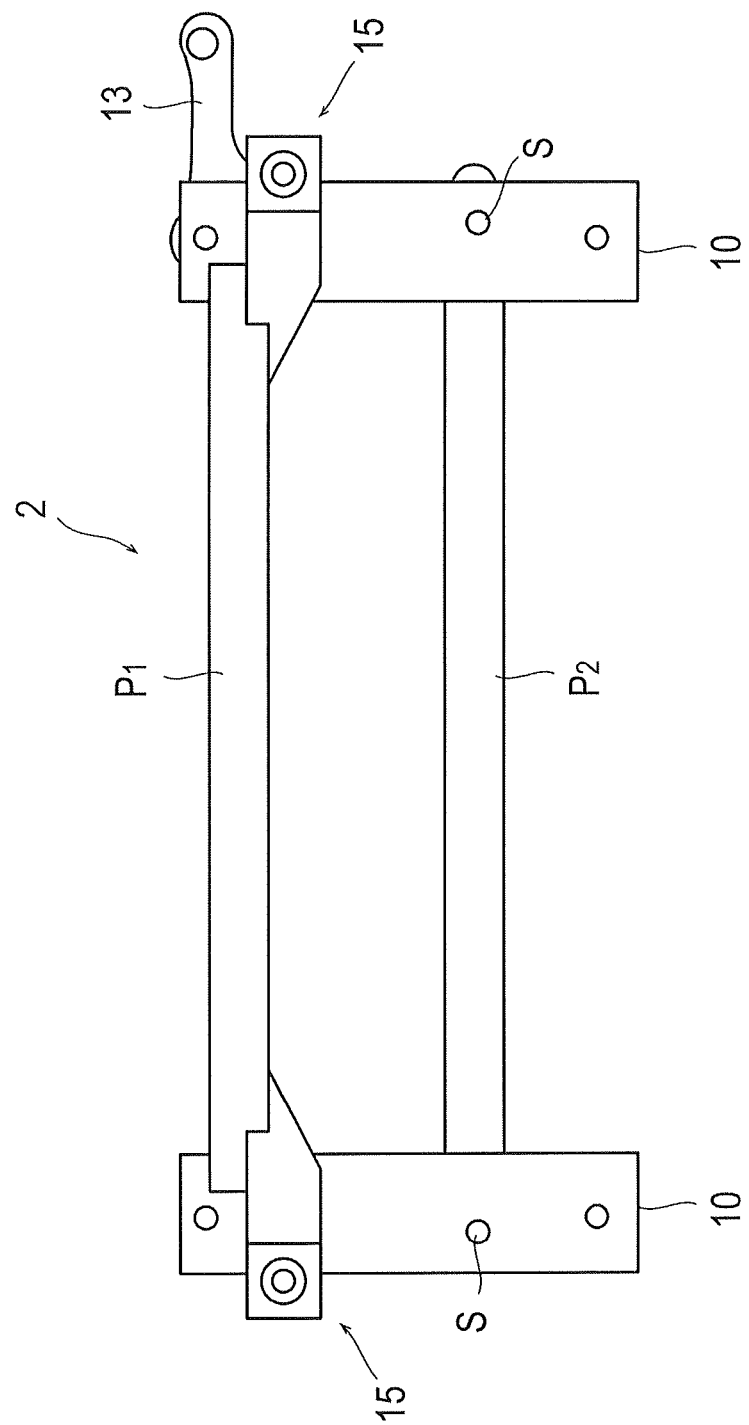
FIG. 8 is a schematic plan view showing Variation 2 of the embodiment.

FIG. 8 is a plan view of Variation 2. Note that the same reference signs are used for members that are the same as shown in FIGS. 1 to 5 and the like, and description thereof is omitted. The main body member 2 described above is substantially "I"-shaped or rectangular in a plan view. However, the present invention is not limited to this, and, as shown in FIG. 8, the main body member 2 may be composed of molded plates having a framed structure shaped like a curb. In this manner, the main body member 2 can be lightweight even in a case where the main body member 2 has a large area.

The main body member 2 may be one hollow body formed by joining two molded plates, each of which has a framed structure of a curb-like shape. Alternatively, pipe members P1 and P2 may be adopted and provided between the side-end members 10.

In Variation 2 here, there are no components corresponding to the vertical walls 5 provided in the above described embodiment, and it is preferable that the pipe member P2 be installed at locations on the line connecting the support points S for supporting the base end sections of the arm members 13, or in the vicinity of this line. In this manner, the pipe member P2 is caused to counteract inputs from the arm members 13, whereby the main body member 2 is made more highly rigid.

The present invention is not limited only to the above described embodiment, and various modifications can be made thereto by those skilled in the art without departing from the technical scope of the present invention. For example, although the above described embodiment includes the side-end members 10 provided independently from the vehicle body, the axially rear end sides of the side-end members 10 may be attached to a vehicle body reinforcing structural member (a so-called member), or may be arranged in the vicinity thereof, in some cases. Generally, a vehicle has a vehicle-body reinforcing structural member installed in the front side of the vehicle interior, the vehicle-body reinforcing structural member extending along the width direction of the vehicle and having extremely high rigidity. The side-end members 10 may be attached directly or indirectly to such a vehicle body reinforcing structural member having extremely high rigidity, or may be arranged in such a manner that allows the side-end members 10 to come into contact or collide with the vehicle body reinforcing structural member in response to rearward movement of the side-end members 10 at the occurrence of a head-on collision.

Additionally, although the main body member 2 and each of the side-end members 10 are brought into surface contact with each other to be fixed together, the present invention is not limited only to this manner. Alternatively, a catch may be provided on the side-end member 10 to be used for supporting the main body member 2.

INDUSTRIAL APPLICABILITY

The present invention is suitably applicable for a subframe used for a suspension.

Finally, the present application is based on Japanese Patent Application No. 2009-298411, filed on Dec. 28, 2009, and Japanese Patent Application No. 2010-188776, filed on Aug. 25, 2010, the entire contents of which are incorporated herein by reference.

The invention claimed is:

1. A suspension subframe comprising:
a pair of side-end members supporting base end sections of arm members coupled with wheels and a main body member provided between the side-end members, wherein the main body member is formed of a press-molded plate material and has a vertical wall formed by having at least any one of front and rear sections thereof bent;
the side-end members are attached to opposite side end sections of the main body member in the width direction of a vehicle so as to extend in the front-rear direction of the vehicle, and have high rigidity to function as cores of the subframe independently from the main body member; and
a cross-sectional shape of the side-end members is uniform in the front-rear direction of the vehicle.

2. The suspension subframe according to claim 1, wherein each of the side-end members is composed of a frame-like member having a space in which the base end section of a corresponding one of the arm members is housed.

3. The suspension subframe according to claim 2, wherein the frame-like member is composed of any one of: a member having a cross section perpendicular to an axis that is formed in an angular U-shape, the member having horizontal sections attached to the upper and lower ends of an upstanding section; a member having a cross section perpendicular to the axis that is formed in an L-shape, the member having a horizontal section attached to either the upper end or the lower end of an upstanding section; and a member having a cross section perpendicular to the axis that is formed in a closed structure and in a shape of a hollow square.

4. The suspension subframe according to claim 1, wherein coupling members coupled with the vehicle body are directly attached to the side-end members.

5. The suspension subframe according to claim 1, wherein the vertical wall is positioned on the line connecting support points for supporting the base end sections, of the arm members, which are provided in the respective side-end members.

6. The suspension subframe according to claim 1, wherein the main body member is composed of a molded plate having a rectangular shape in a plan view.

\* \* \* \* \*